May 2, 1967 — D. TANN — 3,316,795
FASTENING DEVICE INCLUDING HELICAL SPRING-LIKE ELEMENT
Filed June 23, 1965

INVENTOR
David Tann
BY Lane, Aitken, Dunner & Ziems
ATTORNEY

United States Patent Office 3,316,795
Patented May 2, 1967

3,316,795
FASTENING DEVICE INCLUDING HELICAL SPRING-LIKE ELEMENT
David Tann, 333 Covington Drive,
Detroit, Mich. 48203
Filed June 23, 1965, Ser. No. 466,287
4 Claims. (Cl. 85—64)

The present invention relates to mechanical fastening elements, and more particularly to a helical spring-like element for fastening members together.

In accordance with one embodiment of the present invention, a very simple, effective fastening element is provided by a piece of wire-like material formed into a helical spring-like element wherein the convolutions of the spring-like element increase in diameter from one end of the element to the other. By positioning the spring-like element within a tapered threaded nut, or around a tapered threaded screw, and rotating and advancing the nut or screw relative to the spring-like element, the spring-like element can be made to contract or expand radially. The expansion of the spring-like element can be utilized to seize or lock a member positioned within the spring-like element in the case of a nut, and the contraction utilized to lock a member positioned about the spring-like element in the case of the tapered threaded screw.

The spring-like element can have a number of different cross-sections such as diamond, square or round, and can have either a constant cross-section or a diminishing cross-section. When a constant cross-section is employed, the spring-like element will increase in diameter from one end thereof to the other as previously described, and when a diminishing cross-section is employed, one surface of the spring-like element can define a cylindrical surface, if desired, with the other surface defining a tapered or conical surface. When the latter is used with the tapered threaded nut, as described above, the inner surface of the spring-like element would define the cylinder, and when used with a tapered threaded screw, as described above, the outer surface of the element would define the cylinder.

Accordingly, it is one object of the invention to provide a simple, rugged and effective fastening element for fastening members together.

It is another object of the invention to provide a helical spring-like element having at least one surface thereof defining a tapered threaded surface to cause the spring-like element to change its dimension radially when a tapered threaded surface is advanced relative to the tapered threaded surface defined by the spring-like element.

It is a further object of the invention to provide a helical spring-like element of the type described above having a constant cross-section from one end of the helix to the other to define internal and external tapered surfaces.

It is a still further object of the invention to provide a helical spring-like element of the type described above formed from wire-like material having a cross-section which diminishes from one end of the helix to the other with one surface of the element defining a tapered surface and the other surface of the element defining a cylindrical surface.

It is a still further object of the invention to provide a helical spring-like element of the type described above for joining two members together wherein one of said members is provided with a tapered threaded surface for cooperating with the tapered threaded surface defined by the spring-like element and the other of said members has a non-threaded surface which is seized or tightly gripped by the spring-like element to fasten the members together.

It is a still further object of the invention to provide a spring-like element for fastening two members together as described above wherein the spring-like element is made of a material which is significantly harder than the member having the tapered threaded surface thereon so that the spring-like element in effect provides a high quality thread for the tapered threaded member.

It is a still further object of the invention to provide a helical spring-like element of the type described above for keying gears, cog wheels, fly wheels, pulleys and other rotatable members to shafts.

It is a still further object of the invention to provide a spring-like element of the type described above for locking a dowel pin in a plate or body.

It is a still further object of the invention to provide a helical spring-like element of the type described above for locking a nut on a bolt.

Other objects and features of novelty of the present invention will be specifically pointed out or will otherwise become apparent when referring, for a better understanding of the invention, to the following description taken in conjunction with the accompanying drawings, wherein.

Figure 1:
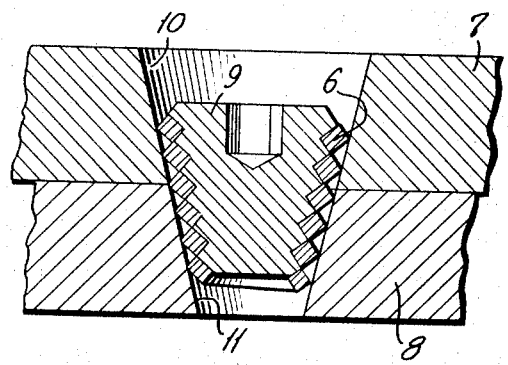
FIG. 1 is a cross-sectional view of a tapered headless screw with a helical spring-like element thereon fastening two members together in accordance with one embodiment of the present invention.

Referring to FIG. 1, a helical spring-helical fastening element 6 embodying features of the invention is illustrated in position to fix a member 7 to a member 8. The element 6 comprises a wire-like material having a constant cross-section which may be a number of different shapes, such as square, triangular, round or diamond shaped as illustrated. The element is tapered to correspond with the tapered threaded surface of a headless screw 9 which threadably engages the internal tapered surface of the element so that as the screw is rotatably and axially advanced relative to the element, the spring-like element 6 will expand radially outwardly and seize the smooth walled tapered holes 10 and 11 in the members 7 and 8 to fasten the members securely together. The edges on the external tapered surface of the spring-like element will dig into the tapered walls of the holes in a manner to provide a tremendous holding pressure. In the preferred embodiment illustrated, the spring-like element 6 is made out of a harder material than the members 7 and 8 to enhance the seizing or holding action. For purposes of economy, the spring-like element can also be of a hardened material as compared to the material of the tapered screw 9. For example, the tapered screw 9 could be made from a cheaper grade metal and the helical spring-like element 6 made from a high quality hardened steel. If desired, the walls of the tapered holes 10 and 11 of the members 7 and 8 can also be threaded so as to threadably engage the external surface of the spring-like element 6 to improve the holding action provided by the spring-like element 6.

Figure 2:
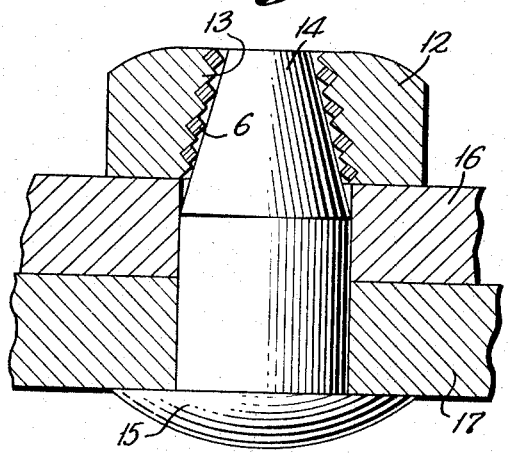
FIG. 2 is a cross-sectional view of a nut secured to a bolt in accordance with another embodiment of the invention.

Referring to FIG. 2, a nut 12 is illustrated with the spring-like element 6 threadably engaging the internal tapered threaded surface 13 of the nut. The internal edge of the element 6 seizes or digs into a tapered surface 14 on the end of a bolt 15 extending through members 16 and 17. In this manner the members 16 and 17 are tightly fastened together by the bolt and nut without requiring threads on the end of the bolt. As before, the spring-like element 6 can be made of hardened steel to improve the gripping or seizing action of the spring-like element on the tapered surface 14.

Figure 3:
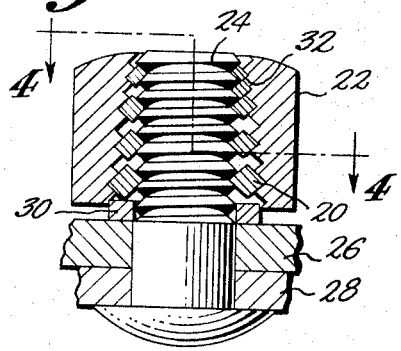
FIG. 3 is a cross-sectional view of a nut locked on a bolt in accordance with another embodiment of the invention.
Figure 4:
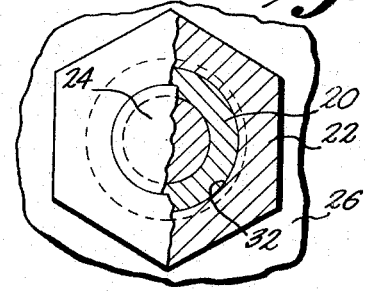
FIG. 4 is a view, partly in section, taken along the line 4—4 of FIG. 3.

Referring to FIGS. 3 and 4, a helical spring-like element 20 having a diamond shaped cross-section is illustrated in position to lock a nut 22 on a threaded bolt 24 to fasten plates 26 and 28 together. A washer 30 may be interposed between the nut 22 and plate 26, if desired, to limit axial movement of the element 20 toward the plate 26. The nut 22 is provided with an internal tapered threaded portion 32 so that as the nut is screwed onto the element 20, it will contract the element 20 in a radial direction to tightly lock the nut on the bolt 24. The element 20 is in the form of a wire-like material having a progressively diminishing diamond shaped cross-section and formed into a helix so as to resemble a coiled spring having a tapered outer surface and cylindrical inner surface.

In assembling the element 20 and nut 22 as illustrated in FIG. 3, the element 20 is first threaded on the bolt 24 until it engages the washer 30. Thereafter, the nut 22 is threaded on the element 20 to provide the binding or locking action. Of course, the locking action can be accomplished without providing the washer 30. For example, the element 20 can project slightly from the nut so as to directly engage the plate 26 in the fully tightened position and in this manner ensure that the nut does not bottom out against the plate 26 before it is fully tightened.

Figure 5:
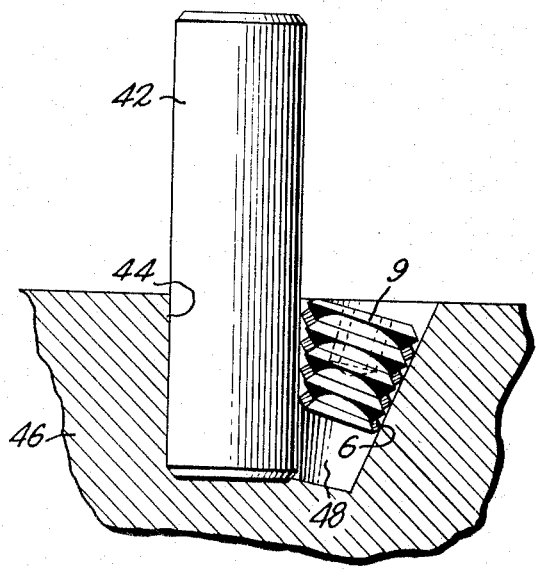
FIG. 5 is a fragmentary, sectional view illustrating a dowel pin locked in position in accordance with another embodiment of the invention.

Referring to FIG. 5, the threadless screw 9 and helical spring-like element 6 of FIG. 1 are illustrated in position to lock a dowel pin 42 in a cylindrical-walled blind hole 44 in a body 46. The headless screw 9 and element 6 are screwed into a tapered hole 48 formed in the body 46 alongside the blind hole 44. The tapered hole 48 communicates with the upper face of the body 46 and also communicates with the blind hole 44 substantially along the line of tangency therebetween so that a portion of the spring-like element 6 can directly engage and dig into the dowel pin 42 as the headless screw 9 is advanced relative to the element 6 to create the binding or locking action for locking the dowel pin 42 in the blind hole 44.

Figure 6:
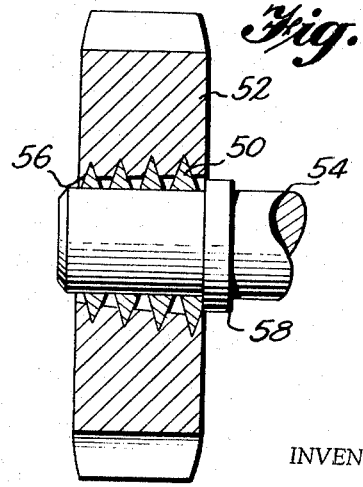
FIG. 6 is a sectional view illustrating a gear keyed to a shaft in accordance with another embodiment of the invention.

Referring to FIG. 6, a helical spring-like fastening element 50 is illustrated in position to fix a rotating member 52, such as a gear, cog wheel, fly wheel, pulley, or other rotating body, on a shaft 54. The external surface of the element 50 forms a tapered thread which threadably engages a tapered threaded portion 56 formed on the wall of the central bore of the member 52. The internal surface of the element 50 defines a cylindrical surface having a normal diameter substantially equal to the diameter of the portion of the shaft 54 to be gripped.

A flange 58 may be provided on the shaft 14 in position to prevent axial movement of the element 50 to the right as viewed in FIG. 6. As the member 52 is screwed onto the element 50 in a clockwise direction, assuming a right-hand thread, it forces the element 50 to contract radially and firmly grip the surface of the shaft 54. Thus the member 52 is effectively locked to the shaft to rotate the shaft in a clockwise direction or, if the shaft 54 is the driving member and the member 52 the driven member, the member 52 is effectively locked to the shaft for rotation therewith when the shaft is rotated in a counterclockwise direction. To remove the member from the shaft, the shaft can be held against rotation and the member 52 rotated in a counterclockwise direction to break the locking force and then rotate the member 52 off the element 50.

One convenient way of making the helical spring-like element 6 of FIG. 1, for example, is to machine threads on internal and external tapered surfaces of a sleeve with the depth of the threads being great enough to break through at the roots thereof to produce the wire-like helix. The helical spring-like element 50 of FIG. 6 can be made in a similar manner by machining a thread on an external tapered surface of a sleeve having a cylindrical inner surface with the root of the thread being deep enough to break through the inner cylindrical surface of the sleeve.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In combination, male and female members having telescoping external and internal surfaces, one of said surfaces being tapered and the other of said surfaces being generally cylindrical with at least one of said surfaces being threaded, and a helical spring-like element, said spring-like element comprising a continuous length of wire-like material forming a helix having a plurality of convolutions, said helix defining inner and outer surfaces with one of said surfaces defining a truncated cone corresponding to said tapered surface and the other of said surfaces defines a cylinder corresponding to said cylindrical surface, the cross-sectional area of said wire-like material progressively diminishing from one end of the helix to its opposite end, said spring-like element threadably engaging said threaded surface so as to be displaced radially when said one member is rotated and advanced axially relative to said helical spring-like element.

2. The invention as defined in claim 1 wherein said helical spring-like element is made of a material which is harder than the material of said tapered threaded portion.

3. In combination, a first member having an internal tapered threaded portion, a helical spring-like element, and a cylindrical member adapted to be received in said spring-like element, said spring-like element comprising a continuous length of wire-like material forming a helix having a plurality of convolutions, said helix defining a truncated conically tapered outer surface corresponding to the taper of the tapered threaded portion of said first member and a cylindrical inner surface adapted to receive said cylindrical member, the cross-sectional area of said wire-like material progressively diminishing from the larger diameter end of the helix to its opposite end, said spring-like element threadably engaging said internal tapered threaded portion so as to be displaced radially when said tapered threaded portion is rotated and advanced axially relative to said helical spring-like element.

4. In combination, male and female members having telescoping external and internal surfaces, one of said surfaces being tapered and the other of said surfaces being generally cylindrical, and a helical spring-like element, said spring-like element comprising a continuous length of wire-like material forming a helix with a plurality of convolutions, said helix defining inner and outer surfaces with one of said surfaces defining a truncated cone corresponding to the taper of said one member and the other of said suraces defines a cylinder corresponding to said cylindrical surface, the cross-sectional area of said wire-like material progressively diminishing from the large diameter end of the helix to its opposite end, said spring-like element defining a tapered thread engaged with said one surface and being tightly locked against said other surface whereby said male and female members are fixed.

References Cited by the Examiner

UNITED STATES PATENTS

| | | | |
|---|---|---|---|
| 730,585 | 6/1903 | Thiollier | 85—64 |
| 964,062 | 7/1910 | Seddon. | |
| 1,384,154 | 7/1921 | Rosenberg. | |
| 1,966,520 | 7/1934 | Rayner | 85—64 |
| 2,340,472 | 2/1944 | Illsche. | |
| 3,062,568 | 11/1962 | Andresen et al. | 85—46 |

FOREIGN PATENTS

| | | |
|---|---|---|
| 1,340,396 | 9/1963 | France. |
| 21,852 | 11/1905 | Great Britain. |
| 49,654 | 10/1909 | Switzerland. |

CARL W. TOMLIN, *Primary Examiner.*

R. S. BRITTS, *Assistant Examiner.*